No. 676,105. Patented June 11, 1901.
P. H. THOMAS.
PROTECTING DEVICE FOR COILS OF ELECTRICAL APPARATUS.
(Application filed Nov. 9, 1900.)
(No Model.)
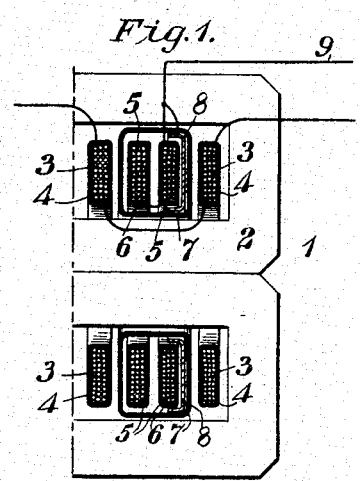
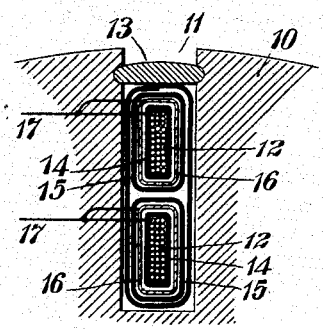 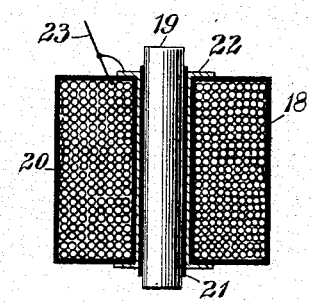
WITNESSES:
C. L. Belcher
Birney Hines
INVENTOR
Percy H. Thomas
BY
Wesley G. Carr
ATTORNEY.

UNITED STATES PATENT OFFICE.

PERCY H. THOMAS, OF PITTSBURG, PENNSYLVANIA, ASSIGNOR TO THE WESTINGHOUSE ELECTRIC & MANUFACTURING COMPANY, OF PENNSYLVANIA.

PROTECTING DEVICE FOR COILS OF ELECTRICAL APPARATUS.

SPECIFICATION forming part of Letters Patent No. 676,105, dated June 11, 1901.

Application filed November 9, 1900. Serial No. 35,992. (No model.)

*To all whom it may concern:*

Be it known that I, PERCY H. THOMAS, a citizen of the United States, residing at Pittsburg, in the county of Allegheny and State of Pennsylvania, have invented a new and useful Improvement in Protecting Devices for the Coils of Electrical Apparatus, of which the following is a specification.

My invention relates to the protection of the coils of electrical apparatus from short circuits caused by sudden changes in static potential; and it consists of a conducting-shield placed between the coil to be protected and any other object or objects having comparatively large electrostatic capacity therewith and means for making electrical connection between the conducting-shield and that terminal of the coil to be protected through which the abrupt changes of static potential are transmitted to the coil.

My invention is illustrated in the accompanying drawings, in which—

Figure 1 is a view, partially in section and partially in elevation, of one-half of a transformer provided with my protecting device. Fig. 2 is a sectional view of a portion of a generator or motor armature provided with my coil-protecting device, and Fig. 3 is a sectional view of a magnet-coil of ordinary cylindrical form provided with my protecting device.

Every coil of insulated wire that is connected with an external circuit and has electrostatic capacity with other bodies has in general a bound charge of electricity on such of its surfaces as are exposed to the bodies having electrostatic capacity therewith. This bound charge necessarily changes with every change of potential difference between the coil and the adjacent body, and the electricity necessary to produce the change in the bound charge must be supplied through one of the leads of the coil and will normally pass around the turns of the coil to reach its destination. An appreciable length of time will be required, however, for the flow of electricity necessary to bring about a readjustment of the bound charge, and if the change of potential be sudden its full value may be impressed upon those portions of the coil that are nearest to the terminal through which the disturbance is transmitted to the coil. Under such conditions the strains exerted upon the insulation between the turns of the coil are much greater than the normal and may be of sufficient proportions to effect a rupture of the insulation, which in many cases will disable the entire apparatus. If, however, a conducting-shield be placed between the coil and adjacent bodies having comparatively large electrostatic capacity therewith and such shield be electrically connected to the terminal or lead through which the dangerous change in potential is transmitted to the coil, the entire bound charge will appear on the shield, and thus entirely relieve the coil therefrom and protect the insulation of the coil from the strains to which it would otherwise be subjected. The coils to be thus protected by means of a protecting-shield may be embodied in any form of electrical apparatus or device in which such coils are ordinarily used, and the change of static potential may be produced by atmospheric electricity or lightning by switching, grounding of the circuits, contact with circuits of higher potential, or any other cause tending to produce such changes of potential.

Referring now to Fig. 1 of the drawings, the transformer 1 comprises a core 2, of laminated iron, one or more low-tension coils 3, surrounded by suitable insulating material 4, one or more high-tension coils 5, surrounded by two layers of insulating material 6 and 7, and a shield of conducting material 8, interposed between the layers 6 and 7. The shield is electrically connected to the terminal of the high-tension supply-conductor 9 for the purpose already stated. Since only one-half of the transformer is shown, I have shown only one terminal conductor and one shield; but it will be understood that two high-tension supply-conductors are employed and that each is connected to an independent shield that is interposed between the corresponding portion of the high-tension windings and the adjacent portion of the core of the transformer or between the high-tension winding and the low-tension winding, or both, as shown.

In Fig. 2 I have shown a portion of an armature-core 10, of usual construction, having a slot 11, in which are located the armature-coils 12, the coils being held in the slots by means of wedges 13. That portion of each coil which is located in the slot is surrounded by two cells 14 and 15, of suitable insulating material, and between these cells is located a shield or band 16, of conducting material, the latter being electrically connected to the lead 17 of the coil, as indicated.

Under certain conditions of operation it may be necessary to provide protecting-shields for only the coils that are nearest the terminals through which abrupt changes of static potential are transmitted to the winding, while under other conditions it may be found advantageous to employ shields in connection with all of the coils comprised in the winding.

In Fig. 3 the coil 18, provided with a core 19, is of usual cylindrical construction, such as may be employed in arc-lamps, telegraph or telephone instruments, or in any other relation where such coils are ordinarily used. The coil is surrounded by suitable insulation 20, and that portion of the core included within the coil is also surrounded by an insulating-shell 21, a tube or shield 22, of conducting material, being interposed between the insulation 20 and insulation 21. The conducting tube or shield 22 is electrically connected to the terminal 23, leading to the coil 18, as indicated.

In case the coil 18 were employed in connection with a complete metallic circuit it would of course be desirable to employ two protecting-shields insulated from each other and respectively connected to the supply-conductors, as indicated in connection with the coils already described.

I desire it to be understood that the invention is not limited to the use of insulation of any specific composition or form, and, further, that the conducting-shield may be of any material having sufficient conductivity to readily and quickly receive the bound charge due to abrupt changes in static potential, and thus protect the coil and its insulation from such abrupt changes.

I claim as my invention—

1. The combination with a coiled conductor, of a conducting-shield adjacent thereto but separated therefrom by insulation and electrically connected to one terminal of the coil.

2. The combination with a coiled conductor and a body having electrostatic capacity therewith, of a conducting-shield interposed between and insulated from said coil and said body and electrically connected to one terminal of the coil.

3. In an electrical machine or apparatus, the combination with one or more coils of such machine or apparatus and a part or parts having electrostatic capacity with said coil or coils, of one or more conducting-shields interposed between said coil or coils and the part or parts having electrostatic capacity therewith but insulated therefrom and electrically connected to those terminals or the coil or coils through which static disturbances may be transmitted.

4. The combination with an electric coil and an adjacent body having electrostatic capacity therewith, of a shield of conducting material interposed between said coil and body but insulated therefrom and provided with an electrical connection to one terminal of the coil.

In testimony whereof I have hereunto subscribed my name this 5th day of November, 1900.

PERCY H. THOMAS.

Witnesses:
WESLEY G. CARR,
BIRNEY HINES.